(12) United States Patent
Phung et al.

(10) Patent No.: US 11,433,494 B2
(45) Date of Patent: Sep. 6, 2022

(54) JIG FOR MOUNTING A COMPONENT ON A STRUCTURE

(71) Applicant: Honda Motor Co., Ltd., Tokyo (JP)

(72) Inventors: Thien Phung, Toronto (CA); Kent Hsieh, Toronto (CA); Benjamin B MacArthur, Barrie (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/117,652

(22) Filed: Dec. 10, 2020

(65) Prior Publication Data
US 2022/0184759 A1      Jun. 16, 2022

(51) Int. Cl.
*B23P 19/10*          (2006.01)
*B60B 29/00*          (2006.01)

(52) U.S. Cl.
CPC ............ *B23P 19/10* (2013.01); *B60B 29/001* (2013.01)

(58) Field of Classification Search
CPC ................................ B23P 19/10; B60B 29/001
See application file for complete search history.

(56) References Cited

U.S. PATENT DOCUMENTS

| 4,825,977 | A | * | 5/1989 | Isogai | B66F 7/02 187/206 |
| 5,358,217 | A | * | 10/1994 | Dach | B66F 3/00 254/134 |
| 10,076,931 | B2 | * | 9/2018 | Finkbeiner | B66F 3/46 |
| 10,787,349 | B2 | * | 9/2020 | Benz | B66F 7/02 |
| 2011/0037041 | A1 | * | 2/2011 | DeJong | B66F 3/46 254/89 R |
| 2016/0002015 | A1 | * | 1/2016 | De Jong | B61K 5/00 254/89 R |
| 2016/0046470 | A1 | * | 2/2016 | Benz | B66F 3/46 254/133 R |
| 2017/0320715 | A9 | * | 11/2017 | Mathieson | B60B 30/02 |

FOREIGN PATENT DOCUMENTS

| CN | 2806201 | Y | * | 8/2006 | ............ B60B 29/00 |
| CN | 2806201 | Y |   | 8/2006 | |
| CN | 206352027 | U | * | 7/2017 | ............... B60B 3/02 |
| CN | 206352027 | U |   | 7/2017 | |

\* cited by examiner

*Primary Examiner* — Bayan Salone
(74) *Attorney, Agent, or Firm* — Mark Duell; American Honda Motor Co., Inc.

(57) ABSTRACT

A jig for mounting a component on a structure is disclosed. The jig includes a frame having a base defining an elongated channel and adapted to be disposed substantially parallel to a surface. The jig also includes a support assembly for supporting the component to facilitate the mounting of the component on the structure. The support assembly extends vertically through the elongated channel and adapted to slide relative to the base along a length of the elongated channel.

12 Claims, 5 Drawing Sheets

JIG FOR MOUNTING A COMPONENT ON A STRUCTURE

BACKGROUND

The disclosed subject matter relates generally to a jig for supporting a component for mounting the component to a structure. More particularly, the disclosed subject matter relates to a jig suitable for mounting a wheel on a vehicle at an assembly line.

At an assembly line, jigs are generally used to manually install wheels on the vehicle. However, the current jigs are not properly aligned and oftentimes operators need to lift up the wheel onto the wheel studs in order to install the wheel. Moreover, the current jigs are custom fit for each wheel, and therefore cannot be used to install wheels of different dimensions. Furthermore, sometimes after installing the wheels, it is difficult to pull fixtures of the jigs from underneath the wheels as larger wheels tend to get stuck, which is undesirable.

SUMMARY

In accordance with one embodiment of the present disclosure, a jig for mounting a component on a structure is provided. The jig includes a frame having a base defining an elongated channel and adapted to be disposed substantially parallel to a surface. The jig also includes a support assembly for supporting the component to facilitate the mounting of the component on the structure. The support assembly extends vertically through the elongated channel and adapted to slide relative to the base along a length of the elongated channel.

In accordance with another embodiment of the present disclosure, a jig for mounting a wheel on a vehicle is provided. The jig includes a frame having a base defining an elongated channel and adapted to be disposed substantially parallel to a surface. The jig also includes a support assembly for supporting the wheel to facilitate the mounting of the wheel on the vehicle. The support assembly extends vertically through the elongated channel and adapted to slide relative to the base along a length of the elongated channel.

In accordance with yet a further embodiment of the present disclosure a jig for mounting a wheel on a vehicle is provided. The jig includes a frame having a base defining an elongated channel and adapted to be disposed substantially parallel to a surface. The jig further includes a support assembly for supporting the wheel to facilitate the mounting of the wheel on the vehicle. The support assembly includes a base structure and a cradle removably engaged with the base structure and extending vertically and outwardly from the base structure. The base structure is adapted to support the support assembly on the surface and extends vertically through the elongated channel. The base structure is adapted to slide along a length of the elongated channel. Furthermore, the cradle is adapted to support the wheel and is adapted to move in a vertical direction relative to the base structure.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-5, wherein like numbers indicate the same or corresponding elements throughout the views.

Figure 1:
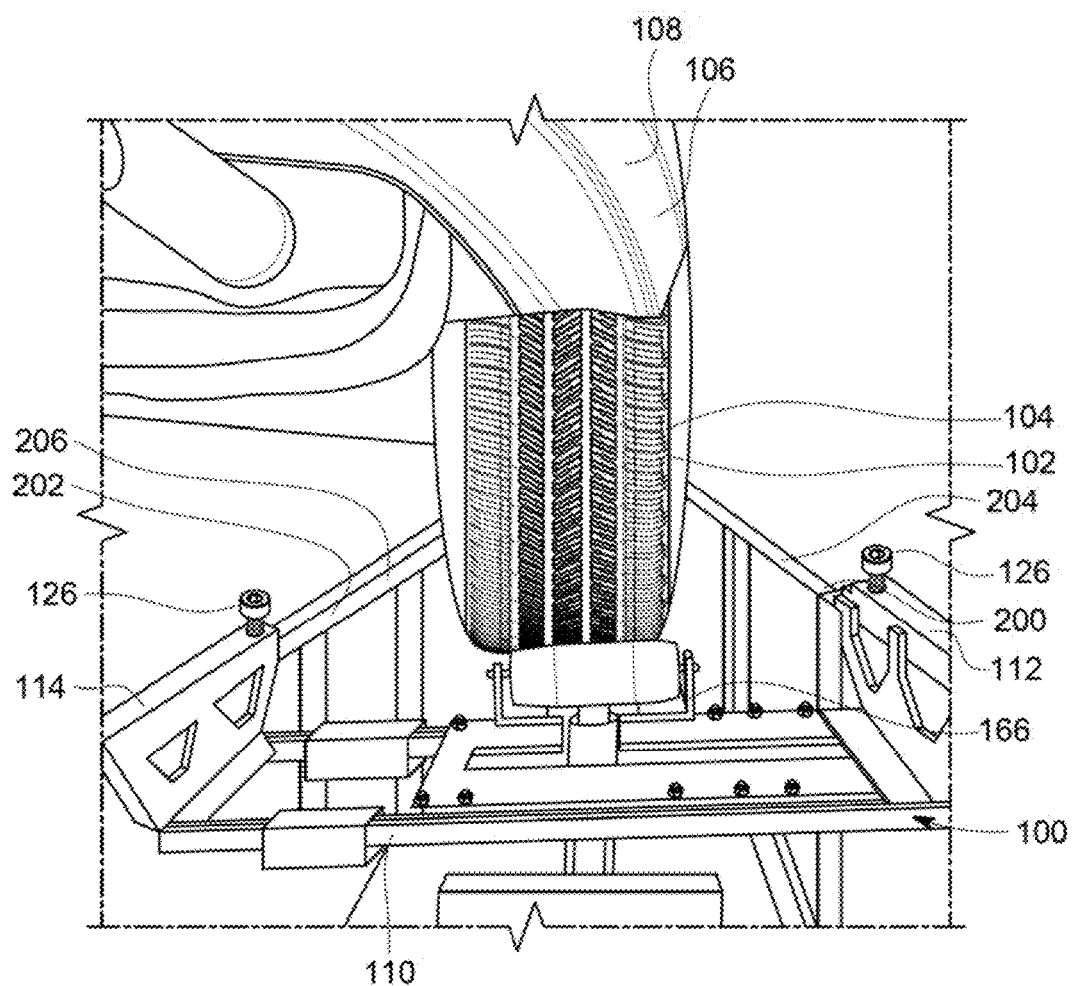
FIG. 1 is a front perspective view depicting a jig mounted to mounting structures and supporting a wheel for mounting on a vehicle, in accordance with one embodiment of the present disclosure.

FIG. 1 illustrates a perspective view of a jig, indicated generally at 100, in accordance with one embodiment of the present disclosure. The jig 100 is shown to be used to mount a component 102, such as, a wheel 104, on a structure 106, such as, a vehicle 108 on an assembly line. However, the jig 100 in according with alternative embodiments can be utilized for mounting any component on any structure. For example, the jig 100 can be used to mount an axle, a shocker, an exhaust aftertreatment system on a vehicle frame.

Figure 2:
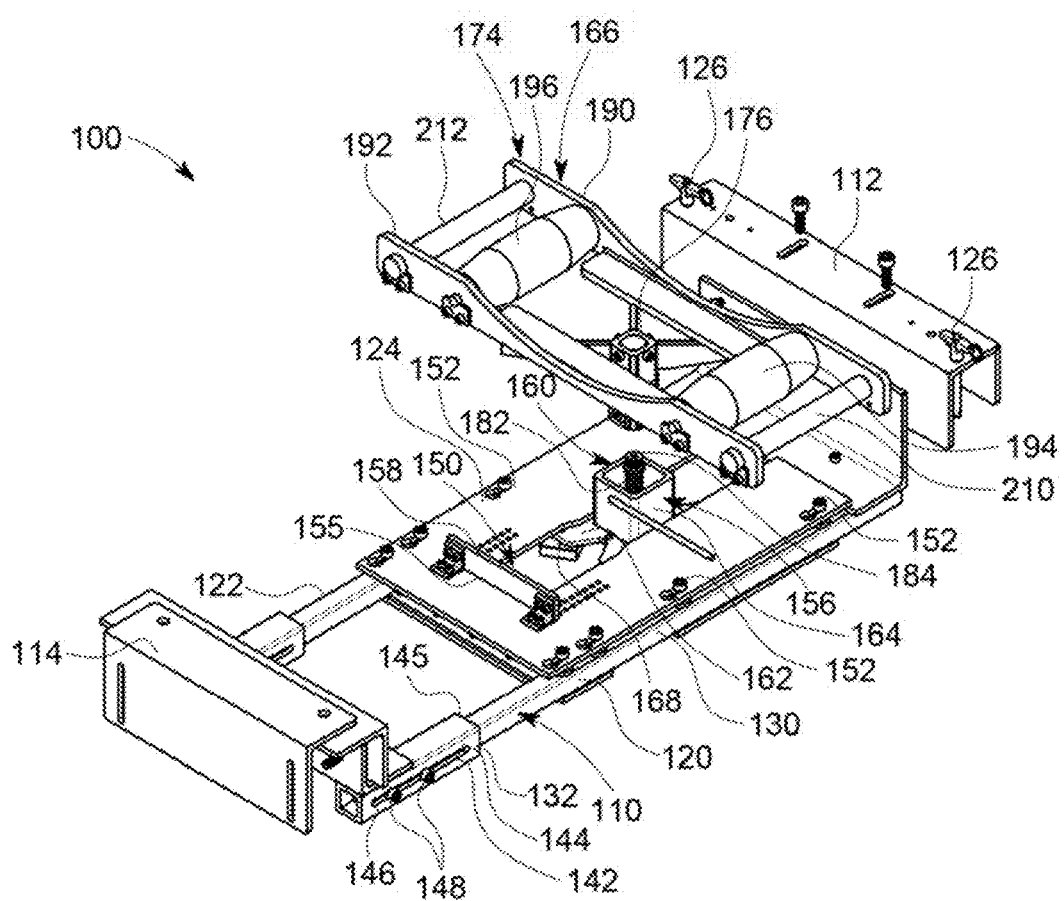
FIG. 2 is perspective view of the jig depicting a frame and a support assembly, in in accordance with one embodiment of the present disclosure.
Figure 3:
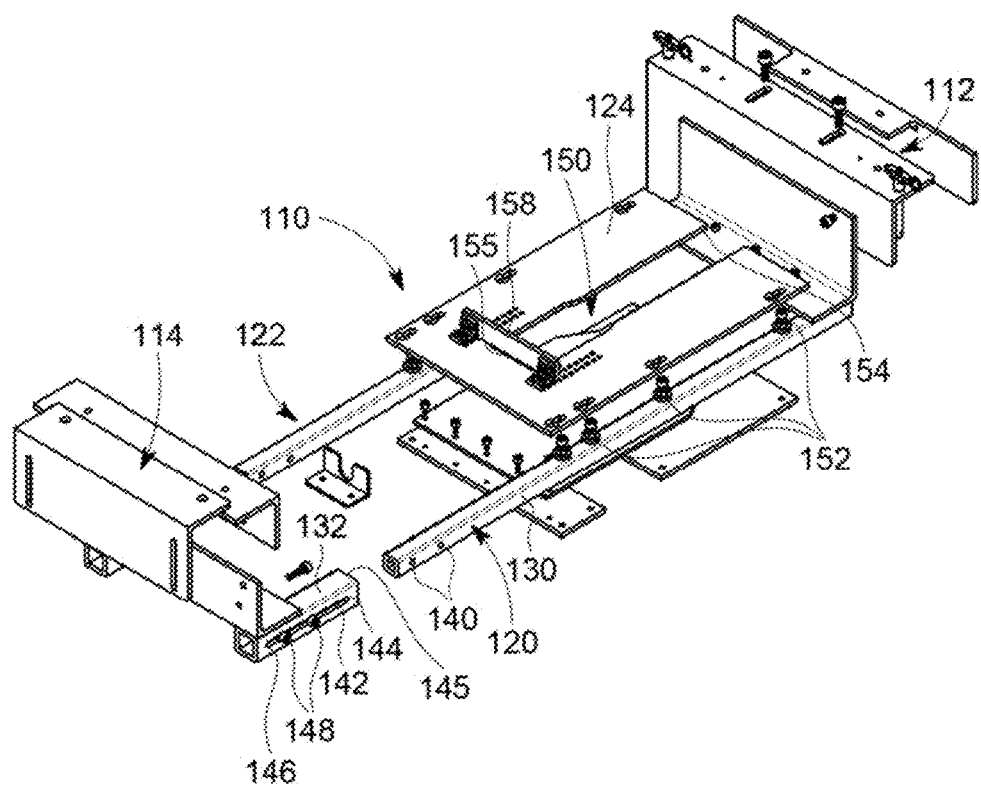
FIG. 3 is an exploded view of the frame, in accordance with one embodiment of the present disclosure.

As shown, the jig 100 is adapted to mounted to one or more mounting structures, for example, a first mounting structure 200 and a second mounting structure 202, and includes a frame 110 that facilitates mounting of the jig 100 to the mounting structures 200, 202. In embodiments, the first mounting structure 200 and the second mounting structure 202 may be guard rails 204, 206 disposed in a vehicle assembly line. As shown in FIG. 1, the first guard rail 204 and the second guard rail 206 are arranged substantially parallel to each other and facilitates a sliding of the frame 110 along the guard rails 204, 206. As shown in FIGS. 1, 2, and 3 the frame 110 includes a first bracket 112 adapted to be coupled to the first mounting structure 200, a second bracket 114 adapted to be mounted to the second mounting structure 202, a pair of arm assemblies 120, 122 extending from the first bracket 112 to the second bracket 114, and a base 124 supported on the pair of arm assemblies 120, 122. As shown, the first bracket 112 includes a C shaped channel and is disposed spaced apart and substantially parallel to the second bracket 114. Similar to the first bracket 112, the second bracket 114 includes a C-shaped channel. In an embodiment, each of the brackets 112, 114 may include a plurality of plates that may be removably engaged to each other using fasteners. Further, the brackets 112, 114 are mounted to corresponding mounting structures 200, 202 by using a plurality of fasteners 126. It may be appreciated that a position of the frame 110 (i.e. the brackets 112, 114), and hence the jig 100, can be changed by loosening the fasteners 126, sliding the brackets 112, 114 along the mounting structures 200, 202, and then tightening the fasteners 126. Also, in an embodiment, the first bracket 112 and the second bracket 114 may be vertically spaced from the pair of arm assemblies 120, 122 and may be connected using suitable structures, such as, plates, columns, etc.

Further, the pair of arm assemblies 120, 122 facilitates in adjusting a distance between the first bracket 112 and the second bracket 114 based on the distance between the two mounting structures 200, 202. The pair of arm assemblies 120, 122 includes a first arm assembly 120 and a second arm assembly 122 disposed spaced apart and substantially parallel to the first arm assembly 120. It may be appreciated that the first arm assembly 120 and the second arm assembly 122 are identical in construction, structure, assembly, and function, and therefore, for the sake of clarity and brevity, the construction, the structure, the assembly, and the function of only the first arm assembly 120 is explained.

The first arm assembly 120 includes a first arm 130 attached to the first bracket 112 and extends substantially perpendicular to the first bracket 112 in a horizontal direction, and a second arm 132 engaged with the first arm 130 and adapted to telescopically extend or retract relative to the first arm 130. Also, the second arm 132 is attached to the second bracket 114 and extend substantially perpendicularly to the second bracket 114 in the horizontal direction. A telescopic extension or retraction of the second arm 132 relative to the first arm 130 enables an operator to adjust the distance between the first bracket 112 and the second bracket 114. In an embodiment, the first arm 130 and the second arm 132, each is a tube having a rectangular or square cross-section. Although, the arms 130, 132 having the rectangular or square cross-sections are contemplated, it may be envisioned that the arms 130, 132 having any other cross-sections, such as, but not limited to, circular, elliptical, or polygonal, etc., can also be utilized. Further, to lock the relative positioning of the second arm 132 with the first arm 130, the first arm 130 may define at least one first slot 140 (shown in FIG. 3), and the second arm 132 defines a second slot 142 extending at least along a length of the second arm 132. The second slot 142 is a longitudinally extending slot that extends along a portion of length of the second arm 132, and includes a first end 144 disposed proximate to a free end 145 of the second arm 132 and a second end 146 disposed distally from the free end 145. To lock the first arm 130 with the second arm 132, the at least one fastener 148 is inserted through the first slot 140 and the second slot 142, and engaged/tightened with the first arm 130 and the second arm 132.

Further, the arm assemblies 120, 122 support the base 124 and are connected to the base 124. The base 124 may be formed by connecting a plurality of plates, and is connected to the first arm 130 of each of the arm assemblies 120, 122 and extends between the two arm assemblies 120, 122. Further, the base 124 defines an elongated channel 150 extending along a length of the base 124 and arranged substantially parallel to the first arm 130. The base 124 is disposed substantially parallel to the surface, and may be connected to the arm assemblies 120, 122 using a plurality of fasteners 152. In some embodiment, the base may be welded to the first arms 130 of the arm assemblies 120, 122. As shown, the elongated channel 150 may extend from a first longitudinal end 154 of the base 124 disposed proximate to the first bracket 112 towards a second longitudinal end 155 that is arranged distally to the first bracket 112. The elongated channel 150 facilitates an extension of a support assembly 156 of the jig 100 outwardly of the base 124 and acts as guide for a sliding motion of the support assembly 156 relative to the base 124. Further, the base 124 may include a stopper plate 158 arranged at the second longitudinal end to restrict the sliding of the support assembly 156.

Figure 4:
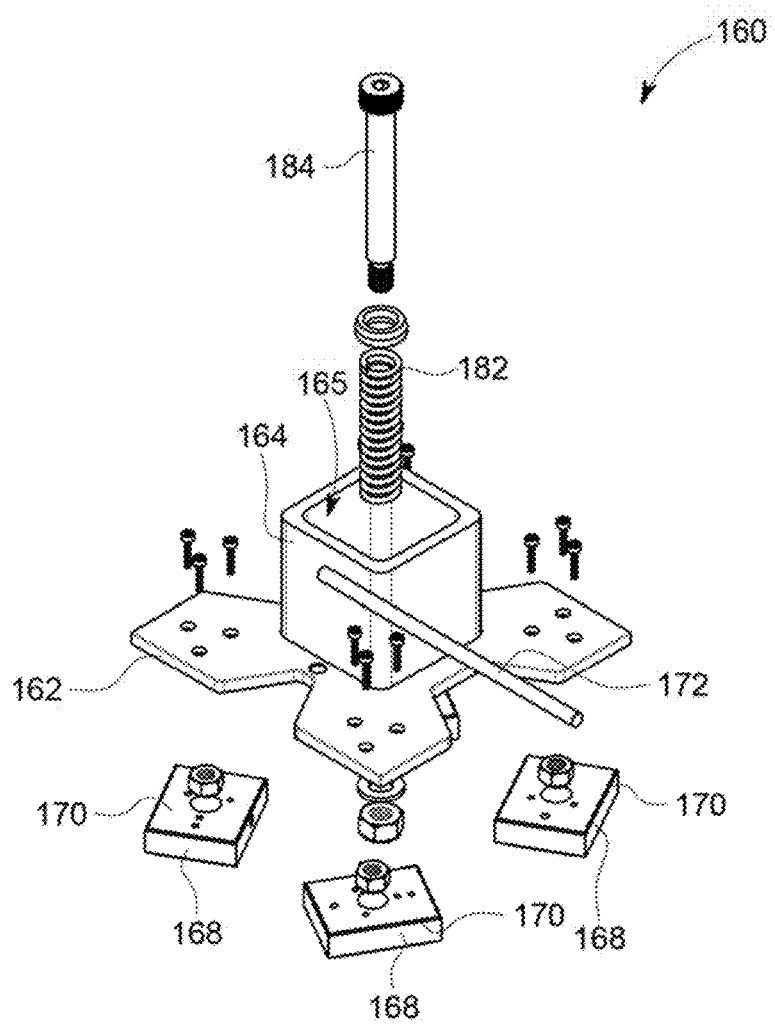
FIG. 4 is an exploded view of a base structure of the support assembly of FIG. 2, in accordance with one embodiment of the present disclosure.

Referring to FIG. 2, the support assembly 156 supports the wheel 104 to facilitate the mounting of the wheel 104 on the vehicle 108, and extends vertically through the elongated channel 150. As shown, the support assembly 156 includes a base structure 160 adapted to support the support assembly 156 on a surface, such as, a floor of the assembly shop, and facilitates the sliding of the support assembly 156 along a length of elongated channel 150 relative to the base 124. As shown in FIG. 4, the base structure 160 may include a bottom plate 162 disposed substantially horizontally and parallel to the surface, and a mount block 164 connected to the bottom plate 162 and extending outwardly and perpendicularly from the bottom plate 162. As shown in FIG. 2, the mount block 164 extends through the elongated channel 150 and may define a cavity 165 and engages with a cradle 166 of the support assembly 156. Further, the base structure 160 may include a plurality of sliders 168 attached to the bottom plate 162 and adapted to facilitate the sliding of the support assembly 156 over the surface. In an embodiment, as shown in FIG. 4, the plurality of sliders 168 are a plurality of air bearings 170 engaged to the bottom plate 162 and adapted to abut the surface, thereby supporting the base structure 160 on the surface. The air bearings 170 are adapted to receive a compressed air from an air source (not shown) and facilitates the sliding of the base structure 160, and hence the support assembly 156 relative to the surface. A direction of the sliding of the base structure 160 may be controlled by controlling a pressure, a direction of air entering each of the air bearings 170, and a direction of exit of the compressed air from the air bearings 170. To facilitate the supply of compressed air to the air bearings 170, the base structure 160 may include an air conduit 172 extending from the mount block 164. Each of the air bearings 170 may include at least one air channel having an air inlet and air outlet to enable a flow of compressed air though the air bearing 170. In some embodiment, the sliders 168 may be rollers (not shown) having roller bearings to facilitate the sliding of the support assembly 156 on the surface.

Figure 5:
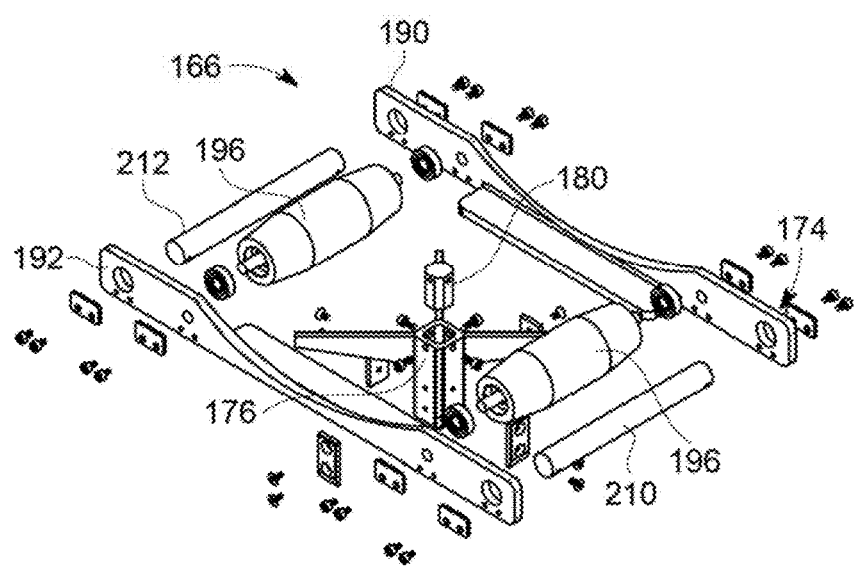
FIG. 5 is an exploded view of a cradle of the support assembly of FIG. 2, in accordance with one embodiment of the present disclosure.

Referring to FIG. 5. an exploded view of the cradle 166 of the support assembly 156 is shown. As shown in FIG. 1, the cradle 166 supports the wheel 104 during the mounting of the wheel 104 on the vehicle 108. As shown in FIGS. 2 and 5, the cradle 166 includes a carriage structure 174 on which the wheel 104 rests during mounting, and a slider block 176 connected to the carriage structure 174 and extending vertically and downwardly from the carriage structure 174. The slider block 176 is a hollow block and is adapted to removably engage with the mount block 164. Accordingly, the cradle 166 is removably engaged with the base structure 160 and extends outwardly of the base structure 160. The slider block 176 is adapted to partially disposed inside the mount block 164 and is engaged with the mount block 164 such that the slider block 176, and hence the cradle 166, moves in a vertical direction relative to the base structure 160. Further, cradle 166 includes a stopper 180 removably engaged with slider block 176. The stopper 180 is adapted to engage with a spring 182 of the support assembly 156 and facilitates the vertical movement of the cradle 166 relative to the base structure 160. As shown in FIG. 2, the spring 182 is disposed inside the mount block 164 surrounding a guide bar 184 that is removably coupled to the bottom plate 162 and extends in a vertical direction. The guide bar 184 is arranged inside the cavity 165 and facilitates a linear compression and extension of the spring 182 in response to the weight of the wheel 104 on the carriage structure 174. Further, the spring 182 is adapted to bias the carriage structure 174 (i.e. the cradle 166) to a first position. In an embodiment, at the first position, the carriage structure 174 is disposed at a maximum distance from the base 124. Accordingly, the slider block 176 is disposed at an outermost position relative to the mount block 164. The carriage structure 174, and hence the cradle 166, is adapted to move downwardly from the first position under the weight of the wheel 104 and moves back to the first position, due to the biasing force of the spring 182, when the wheel 104 is removed from the carriage structure 174. Accordingly, wheels having various dimensions, for example, diameters, can be supported on the support assembly 156 and mounted on the vehicle 106 using the single jig 100.

The carriage structure 174 extends substantially parallel to the base 124 (as shown in FIG. 2), and may include a first carriage plate 190 and a second carriage plate 192 disposed spaced apart from the first carriage plate 190 and connected/coupled to the first carriage plate 190. As shown, the first carriage plate 190 and the second carriage plate 192 extend substantially parallel to the first bracket 112 and are connected to the slider block 176. Further, the carriage structure 174 includes a pair of rollers, for example a first roller 194 and a second roller 196 disposed spaced apart and substantially parallel to the first roller 194. The first roller 194 and the second roller 196 are rotatably connected to the first carriage plate 190 and the second carriage plate 192, and extend from the first carriage plate 190 to the second carriage plate 192. The rollers 194, 196 are adapted to rotate/roll about respective central axes. Further, the rollers 194, 196 are arranged in such a manner that the slider block 176 is arranged between the two rollers 194, 196. During mounting, the wheel is supported on the rollers 194, 196 to facilitate a rolling of the wheel 104 relative to the carriage structure 174.

Moreover, the carriage structure 174 may include at least one handle, for example a first handle 210 and a second handle 212, to be grabbed by an operator for moving the cradle 166 and hence the support assembly 156. As shown, the first handle 210 extends from the first carriage plate 190 to the second carriage plate 192 and is disposed proximate to the first roller 194. Similarly, the second handle 212 extends from the first carriage plate 190 to the second carriage plate 192 and is arranged proximate to the second roller 196. It may be appreciated that the first handle 210 is arranged at a lateral distance from the first roller 194 that is located between the slider block 176 and the first handle 210. Similarly, the second handle 212 is arranged at a lateral distance from the second roller 196 such that the second roller 196 is located between the slider block 176 and the second handle 212. Accordingly, the handles 210, 212 are located outwardly of the rollers 194, 196 such that the rollers 194, 196 are disposed between the pair of handles 210, 212.

A method for mounting the wheel 104 using the jig 100 is now explained. To mount the wheel 104 on the vehicle 108, the jig 100 is moved to a desired position by sliding the brackets 112, 114 along the guard rails 204, 206. Thereafter, the jig 100 is secured to guard rails 204, 206 by tightening the fasteners 126. In some scenarios, for mounting the first bracket 112 and the second bracket 114 on the guard rails 204, 206, the distance between the first bracket 112 and the second bracket 114 needs to be adjusted. For so doing, the operator may telescopically move the second arm 132 of each of the arm assemblies 120, 122 relative to associated first arm 130, and then lock the first arm 130 and the second arm 132 by inserting the fasteners through the first slots 140 and the second slot 142, and tightening the fasteners 148 with the arms 130, 132. Subsequently or otherwise, the wheel 104 is positioned on the carriage structure 174. Due to the weight of the wheel 104, the cradle 166, and hence the carriage structure 174, moves downwardly from the first position due to the compression of the spring 182. Thereafter or otherwise, the support assembly 156 is moved along the elongated channel 150 to properly position and align the wheel 104 with wheel studs of the vehicle 108. For sliding the support assembly 156, the operator may slide the support assembly 156 inside the elongated channel 150 between the first longitudinal end 154 and the second longitudinal end 155 by controlling a supply of compressed air to air bearings 170. After positioning, the support assembly 156, the operator may install/mount the wheel 104 to the vehicle 108. Thereafter, the operator may grab one or both the handles 210, 212 and moves the support assembly 156, and hence the cradle 166, from beneath the wheel. As the handles 210, 212 are located at a distance from the rollers 194, 196 with which the wheel 104 is in contact, the carriage structure 174 can be moved easily away from the wheel 104. Also, the cradle 166, and hence the cradle structure 174, moves back to the first position as the cradle 166 is removed from underneath the wheel 104 after installing the wheel 104 on the vehicle 108. As the cradle 166 can move vertically relative to the base structure 160, the current jig 100 facilitates in mounting wheels of various sizes. The current jig 100 can be slid to the position for mounting the wheel 104 whenever necessary, and therefore, is easier to use by the operator.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A jig for mounting a component on a structure, the jig comprising:
   a frame having a base defining an elongated channel and adapted to be disposed substantially parallel to a surface; and
   a support assembly for supporting the component to facilitate the mounting of the component on the structure, the support assembly extends vertically through the elongated channel and adapted to slide relative to the base along a length of the elongated channel, wherein the support assembly includes at least one handle to enable the sliding of the support assembly.

2. The jig of claim 1, wherein the support assembly includes
   a base structure adapted to support the support assembly on the surface and facilitates the sliding of the support assembly, and
   a cradle removably engaged with the base structure and extending outwardly of the base structure, the cradle is adapted to support the component and is adapted to move in a vertical direction relative to the base structure.

3. The jig of claim 2, wherein the support assembly includes a spring engaged with the base structure and the cradle and adapted to bias the cradle to a first position, the spring facilitates the movement of the cradle in the vertical direction.

4. The jig of claim 1, wherein the frame includes
a first bracket adapted to be coupled to a first mounting structure,
a second bracket disposed spaced apart from the first bracket and adapted to engage with a second mounting structure, and
a pair of arm assemblies extending from the first bracket to the second bracket, each arm assembly includes a first arm and a second arm engaged with the first arm and adapted to telescopically move relative to the first arm to adjust a distance between the first bracket and the second bracket.

5. The jig of claim 4, wherein the first arm defines a first longitudinal slot and the second arm defines a second longitudinal slot, and the frame includes at least one fastener adapted to extend through the first slot and the second slot to lock the first arm with the second arm.

6. The jig of claim 4, wherein the base is supported on the pair of arm assemblies and is connected to the first arm of each of the pair of arm assemblies.

7. A jig for mounting a wheel on a vehicle, the jig comprises:
a frame having a base defining an elongated channel and adapted to be disposed substantially parallel to a surface; and
a support assembly for supporting the wheel to facilitate the mounting of the wheel on the vehicle, the support assembly extends vertically through the elongated channel and adapted to slide relative to the base along a length of the elongated channel, wherein the support assembly includes at least one handle to enable the sliding of the support assembly.

8. The jig of claim 7, wherein the support assembly includes
a base structure adapted to support the support assembly on the surface and facilitates the sliding of the support assembly, and
a cradle removably engaged with the base structure and extending outwardly of the base structure, the cradle is adapted to support the wheel and is adapted to move in a vertical direction relative to the base structure.

9. The jig of claim 8, wherein the support assembly includes a spring engaged with the base structure and the cradle and adapted to bias the cradle to a first position, the spring facilitates the movement of the cradle in the vertical direction.

10. The jig of claim 7, wherein the frame includes
a first bracket adapted to be coupled to a first mounting structure,
a second bracket disposed spaced apart from the first bracket and adapted to engage with a second mounting structure, and
a pair of arm assemblies extending from the first bracket to the second bracket, each arm assembly includes a first arm and a second arm engaged with the first arm and adapted to telescopically move relative to the first arm to adjust a distance between the first bracket and the second bracket.

11. The jig of claim 10, wherein the first arm defines a first longitudinal slot and the second arm defines a second longitudinal slot, and the frame includes at least one fastener adapted to extend through the first slot and the second slot to lock the first arm with the second arm.

12. The jig of claim 10, wherein the base is supported on the pair of arm assemblies and is connected to the first arm of each of the pair of arm assemblies.

* * * * *